(12) United States Patent
Patini

(10) Patent No.: US 9,866,403 B2
(45) Date of Patent: Jan. 9, 2018

(54) LEVERAGING A FEMTOCELL NETWORK FOR PREMISES MANAGEMENT OR MONITORING

(71) Applicant: AT&T Mobility II LLC, Atlanta, GA (US)

(72) Inventor: Joseph Patini, Atlanta, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 15/007,535

(22) Filed: Jan. 27, 2016

(65) Prior Publication Data

US 2016/0142221 A1 May 19, 2016

Related U.S. Application Data

(63) Continuation of application No. 12/577,856, filed on Oct. 13, 2009, now Pat. No. 9,279,699.

(51) Int. Cl.
*H04L 12/28* (2006.01)
*H04L 29/08* (2006.01)
*H04W 84/04* (2009.01)
*H04W 84/18* (2009.01)
*G01D 4/00* (2006.01)

(52) U.S. Cl.
CPC ......... *H04L 12/2825* (2013.01); *G01D 4/002* (2013.01); *H04L 12/2834* (2013.01); *H04L 67/12* (2013.01); *H04W 84/045* (2013.01); *H04L 2012/285* (2013.01); *H04L 2012/2841* (2013.01); *H04W 84/18* (2013.01); *Y02B 90/241* (2013.01); *Y02B 90/246* (2013.01); *Y04S 20/32* (2013.01); *Y04S 20/42* (2013.01)

(58) Field of Classification Search
CPC combination set(s) only.
See application file for complete search history.

(56) References Cited

U.S. PATENT DOCUMENTS

| 8,089,400 B1 | 1/2012 | Fang et al. |
| 9,072,028 B2 | 6/2015 | Patini |
| 9,756,546 B2 | 9/2017 | Patini |
| 2003/0011684 A1 | 1/2003 | Narayanaswami et al. |

(Continued)

FOREIGN PATENT DOCUMENTS

| CN | 101206789 | 6/2008 |
| EP | 1215864 | 6/2002 |

(Continued)

OTHER PUBLICATIONS

Office Action dated Oct. 16, 2014 for U.S. Appl. No. 14/446,593, 17 pages.

(Continued)

*Primary Examiner* — Yee Lam
(74) *Attorney, Agent, or Firm* — Amin, Turocy & Watson, LLP

(57) ABSTRACT

The disclosed subject matter relates to an architecture that can leverage femtocell network infrastructure in order to facilitate premises management or monitoring. In particular, the architecture can leverage the local presence of a home nodeB (HNB) located at a premises associated with a subscriber in order to aggregate, process and/or distribute various state information that can be collected at the premises.

20 Claims, 12 Drawing Sheets

(56) References Cited

U.S. PATENT DOCUMENTS

| | | | |
|---|---|---|---|
| 2003/0034900 A1 | 2/2003 | Han | |
| 2005/0132115 A1* | 6/2005 | Leach | G01D 4/004 710/305 |
| 2006/0036967 A1 | 2/2006 | Crichlow | |
| 2006/0195506 A1 | 8/2006 | Deng | |
| 2006/0293956 A1 | 12/2006 | Walker et al. | |
| 2007/0013547 A1 | 1/2007 | Boaz | |
| 2007/0057814 A1 | 3/2007 | Goldberg et al. | |
| 2007/0130408 A1 | 6/2007 | Leach | |
| 2008/0106425 A1 | 5/2008 | Deaver et al. | |
| 2008/0207170 A1* | 8/2008 | Khetawat | H04W 60/005 455/411 |
| 2009/0100492 A1 | 4/2009 | Hicks, III et al. | |
| 2009/0156213 A1* | 6/2009 | Spinelli | H04W 36/36 455/436 |
| 2009/0262682 A1 | 10/2009 | Khetawat et al. | |
| 2009/0269063 A1* | 10/2009 | Bernard | H04B 10/272 398/66 |
| 2009/0273462 A1 | 11/2009 | Addy | |
| 2009/0305671 A1 | 12/2009 | Luft et al. | |
| 2009/0310766 A1 | 12/2009 | Ye | |
| 2010/0013666 A1 | 1/2010 | Panades et al. | |
| 2010/0035647 A1 | 2/2010 | Gholmieh et al. | |
| 2010/0062768 A1* | 3/2010 | Lindqvist | H04W 8/26 455/435.1 |
| 2010/0130209 A1 | 5/2010 | Florkey et al. | |
| 2010/0144362 A1* | 6/2010 | Bernard | H04L 12/2856 455/452.1 |
| 2010/0179877 A1 | 7/2010 | Lam | |
| 2010/0184421 A1* | 7/2010 | Lindqvist | H04J 11/0069 455/418 |
| 2010/0278141 A1* | 11/2010 | Choi-Grogan | H04W 36/0083 370/331 |
| 2010/0330985 A1* | 12/2010 | Addy | G05B 15/02 455/426.1 |
| 2011/0110359 A1 | 5/2011 | Cooke et al. | |
| 2011/0158649 A1 | 6/2011 | Hari | |
| 2012/0044973 A1 | 2/2012 | Johnson et al. | |

FOREIGN PATENT DOCUMENTS

| | | |
|---|---|---|
| JP | 2003092776 | 3/2003 |
| JP | 2005521303 | 7/2005 |
| JP | 2009182620 | 8/2009 |
| JP | 2010520702 | 6/2010 |
| WO | 2007142443 | 12/2007 |
| WO | 2008045781 | 4/2008 |
| WO | 2008096418 | 8/2008 |
| WO | 2008108717 | 9/2008 |
| WO | 2008108716 | 12/2008 |
| WO | 2009048555 | 4/2009 |
| WO | 2009054058 | 4/2009 |

OTHER PUBLICATIONS

International Search Report and Written Opinion dated Dec. 20, 2010 for PCT Application Serial No. PCT/US2010/050449, 12 pages.
Office Action dated Nov. 16, 2011 for U.S. Appl. No. 12/560,670, 25 pages.
Final Office Action dated May 15, 2012 for U.S. Appl. No. 12/560,670, 14 pages.
Office Action dated Feb. 5, 2014 for U.S. Appl. No. 12/560,670, 32 pages.
European Office Action dated Apr. 23, 2013 for European Application Serial No. 10762822.4, 5 pages.
Office Action dated Mar. 4, 2013 for U.S. Appl. No. 12/577,856, 29 pages.
Final Office Action dated Aug. 22, 2013 for U.S. Appl. No. 12/577,856, 27 pages.
3rd Generation Partnership Project;Technical Specification Group Radio Access Network;Home (e)NodeB;Network aspects(Release 8) 3GPP Draft; R3.020__V090__Clean, 3rd Generation Partnership Project (3GPP), Mobile Competence Centre; 650, Route Des Lucioles; F-06921 Sophia-Antipolis Cedex; France, vol. RAN WG3, No. Jeju Island; 20080818, Sep. 3, 2008 (Sep. 3, 2008), XP050423676 p. 21-p. 23 p. 64.
"3rd Generation Partnership Project; Technical Specification Group RAN; UTRAN lu-BC Interface: Service AreaBroadcast Protocol (SABP) (Release 7) 3GPP Standard; 3 GPP TS 25.419, 3rd Generation Partnership Project (3GPP), Mobile Competence Centre; 650, Route Des Lucioles; F-06921 Sophia-Antipolis Cedex; France, No. V8.0.0, Dec. 1, 2008 (Dec. 1, 2008), pp. 1-77, XP050368415 *chapter 9.2.6* *chapter 9.2.11*."
Office Action dated Dec. 11, 2013 for U.S. Appl. No. 12/577,856, 18 pages.
International Search Report and Written Opinion dated Jan. 25, 2011 for PCT Application Serial No. PCT/US2010/047190, 18 pgs.
Japanese Office Action dated Feb. 27, 2014 for Japanese Application Serial No. 2012-529784, 13 pages.
NEC, NIT DOCOMO, "discussion of and Network Interfaces and SABP in HNB-GW." R3(09)01116, RAN Working Group 3 meeting #64, San Francisco, USA, May 4-8, 2009, 4 pages.
Ip.access Ltd., "Issues affecting SABP use for PWS with H(e)NB." 3GPP TSG RAN WG3, R3-092032, Shenzhen, P.R. China, Aug. 24-28, 2009, 3 pages.
Global System for Mobile Communications, "3rd Generation Partnership Project; Technical Specification Group Services and System Aspects; Earthquake and Tsunami Warning System Requirements and Solutions (ETWS); Solution Placeholder (Release 8)" 3GPP TR 23.828 V0.2.0 (May 2008), Valbonne—France, 2006, 24 pages.
Japanese Office Action dated Feb. 13, 2014 for Japanese Patent Application No. 2012-534211, 12 pages.
Chinese Office Action dated Apr. 1, 2014 for Chinese Patent Application No. 2008-2161CN, 9 Pages.
Final Office Action dated Apr. 15, 2014 for U.S. Appl. No. 12/577,856, 23 pages.
Office Action dated Nov. 14, 2014 for U.S. Appl. No. 12/577,856, 37 pages.
Japanese Office action dated Sep. 22, 2014 for Japanese Patent Application No. 2012-529784. 6 pages.
Chinese Office Action dated Dec. 10, 2014 for Chinese Patent Application No. 2008-2161CN. 5 Pages.
Office Action dated Jul. 29, 2015 for U.S. Appl. No. 14/719,959, 22 pages.
Final Office Action dated Feb. 23, 2015 for U.S. Appl. No. 12/577,856, 26 pages.
Japanese Office Action dated Mar. 3, 2015 for Japanese Patent Application No. 2012-534211, 11 pages.
Japanese Office action dated Apr. 14, 2015 for Japanese Patent Application No. 2012-529784,16 pages.
Chinese Office Action dated Jun. 25, 2015 for Chinese Patent Application No. 201080046120.5, 8 Pages.
Office Action dated Jun. 30, 2015 for U.S. Appl. No. 12/577,856, 28 pages.
Notice of Allowance dated Oct. 28, 2015 for U.S. Appl. No. 12/577,856, 30 pages.
Final Office Action dated Nov. 19, 2015 for U.S. Appl. No. 14/719,959, 21 pages.
Chinese Office Action dated Jun. 1, 2016 for Chinese Application Serial No. 201080046120.5, 11 pages.
Japanese Office Action dated Aug. 10, 2015 for Japanese Application No. 2014-173032, 4 pgs.
Korean Office Action for Application No. 10-2012-7008944, dated Mar. 22, 2016, 5 pgs.
European Office Action dated Mar. 3, 2016 for European Application Serial No. 10762822.4, 4 pages.
Japanese Office Action dated May 31, 2016 for Japanese Application Serial No. 2012-529784, 4 pgs. (with English translation).
Office Action dated Mar. 2, 2017 for U.S. Appl. No. 15/190,322, 30 pages.
Office Action dated Nov. 22, 2017 for U.S. Appl. No. 15/679,817, 31 pages.

* cited by examiner

US 9,866,403 B2

LEVERAGING A FEMTOCELL NETWORK FOR PREMISES MANAGEMENT OR MONITORING

CROSS-REFERENCE TO RELATED APPLICATIONS

This application is a continuation of, and claims priority to, U.S. patent application Ser. No. 12/577,856 (now U.S. Pat. No. 9,279,699), filed on Oct. 13, 2009, entitled "LEVERAGING A FEMTOCELL NETWORK FOR PREMISES MANAGEMENT OR MONITORING." The entirety of the above noted application is incorporated herein by reference.

TECHNICAL FIELD

The present application relates generally to femtocell communications networks, and more specifically to utilizing femtocell network infrastructure to facilitate premises management and/or monitoring.

BACKGROUND

Indoor coverage is a primary differentiator among wireless service providers, yet an indoor-environment is not conducive to efficient utilization of radio resources because of various factors such as path loss or attenuation, which can lead to channel quality degradation and ensuing excessive signaling that in turn can substantially increase battery drain for mobile devices operating within the indoor environment. In addition, as wireless service become ubiquitous and thus commoditized, market share of legacy telecommunication systems and service associated therewith are increasingly affected by customer attrition. Thus, femtocells have emerged to exploit legacy systems and extant broadband, non-mobile networks to provide indoor coverage.

Femtocell coverage is generally intended to overlap with extant macro cell coverage to ensure service continuity as a subscriber enters in and exits out of the subscriber's home coverage area, private indoor environment, or other premises where the femtocell resides. Thus, femtocell networks can further leverage the wider coverage provided by conventional macro networks. Conventional macro network platforms that provide service to mobile devices (e.g., user equipment (UE)) must contend with the mobility of the UE when providing communication services. Traditionally, messages intended for a particular UE must be broadcast to a wide area, whereby surrounding nodes of the macro network all broadcast duplicate information to ensure the intended recipient, wherever the UE is located at a given time, receives the communication. In terms of resource utilization, such flood broadcasting is very inefficient, yet often a consequence when the recipient UE potentially expects to maintain a high degree of mobility over a wide area.

In contrast to macro networks, femtocell network platforms rely upon various nodes or femtocells (e.g., home nodeBs (HNBs)). HNBs are building-based wireless access points interfaced with a wired broadband network. As previously noted, HNBs are generally deployed to improve indoor wireless coverage and to offload a mobility radio access network (RAN) operated by a wireless network and service provider. Thus, coverage of a HNB device is generally intended to be approximately confined within the bounds of an indoor compound such as a residential or commercial building.

Unfortunately, communication systems today—those that offer to subscribers both macro network services for coverage over a wide area and femtocell network for indoor home or office use—generally treat the femtocell network as a sub-network of the macro network and thus handle communications in a substantially identical manner. Such treatment is unfortunate because a HNB, unlike mobile phones or other UE, typically does not change location, but rather remains at a particular, known location. Moreover, the HNB maintains a presence within the home or other premises that can be leveraged in a variety of ways that have yet to be taken advantage of.

DETAILED DESCRIPTION

Figure 1:
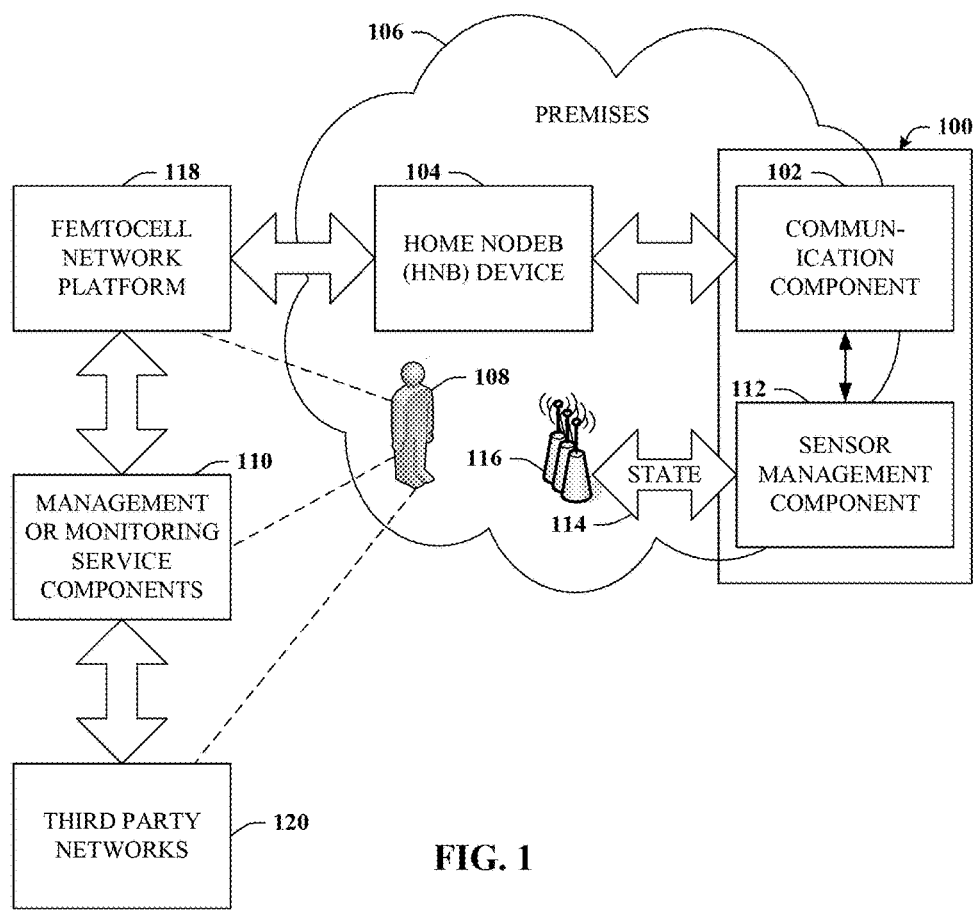
FIG. 1 is a block diagram of a system that can leverage femtocell network infrastructure and/or a femtocell network platform in order to facilitate premises management or monitoring.

The subject matter disclosed herein, in one aspect thereof, comprises an architecture that can leverage femtocell network infrastructure to facilitate premises management or monitoring. In accordance therewith and to other related ends, the architecture can include a communication component that can interface to a home nodeB (HNB) device that operates at a premises associated with a user of a management or monitoring service. Appreciably, the management or monitoring service can leverage the presence of the HNB device in the home or other premises associated with the user in order to, e.g., obtain, aggregate, process, and/or distribute state information that can be conveniently collected at the premises.

In addition, the architecture can include a sensor management component that can receive state information from at least one sensor, wherein the state information can relate to a state of the premises or can relate to a state of equipment, components, or devices thereon, as detected by the at least one sensor in accordance with the management or monitoring service.

In one exemplary aspect, the at least one sensor can be operatively or communicatively coupled to a utility meter maintained by a third party utility provider. Accordingly, the architecture can facilitate dynamic or automatic acquisition of meter readings and propagation of those reading to the third party utility provider. As another exemplary aspect, the at least one sensor can be operatively or communicatively coupled to, e.g., one of an alarm system, a (non-metered) resource consuming device or appliance, or an ambient condition monitor or device. Accordingly, the architecture can facilitate notification of authorities or rescue personnel in the event of an emergency when replacing conventional home alarm services or add more robust features to the home alarm service when working in conjunction with a third party alarm service. Additionally or alternatively, the architecture can notify authorized parties (e.g., the user or an owner of the premises) when certain conditions are met (e.g., an appliance is active, the temperature is at a certain level . . . ). Thus, the authorized party can be informed about substantially any desired attribute or state of the premises, and can adjust settings relating to future notifications or designate suitable actions to take in response, even when away from the premises.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 that can leverage femtocell network infrastructure and/or a femtocell network platform in order to facilitate premises management or monitoring is depicted. Generally, system 100 can include communication component 102 that can interface to a home nodeB (HNB) device 104 that operates at premises 106. Premises 106 can relate to real property and is intended to include one or both the internal confines of a building or structure as well as the external immediate surroundings, typically a home or office or other property where an HNB device is located. For example, premises 106 can be a home or office of user 108, wherein user 108 can be a customer or subscriber of management or monitoring service 110. It should be understood that reference numeral 110 is intended herein to represent either or both the management or monitoring service or the components thereof.

Moreover, user 108, although depicted as an individual, can serve as a proxy for or representation of a suitable device such as a cellular phone, handset, or other mobile device as well as other computing devices such as personal computers or laptops. Accordingly, data transactions detailed herein such as sending data to or receiving data from user 108 can serve to illustrate a presentation to or input by user 108 by way of an associated device, or simply a transaction with the device of user 108. It should be further appreciated that user 108 can also be a customer or subscriber of (in addition to management or monitoring service 110) a femtocell network provider. The femtocell network provider that can, e.g., install and maintain HNB device 104 at premises 106 of user 108 as well as manage or maintain various other femtocell network equipment or platforms such as femtocell network platform 118, examples of which are described infra in connection with FIGS. 10 and 11.

In addition, system 100 can also include sensor management component 112 that can receive state information 114 from at least one sensor 116. While it should be understood that sensor management component 112 can interface to a large number of sensors 116 as well as a wide range of types of sensors 116, for simplicity, some portions of the remainder of this disclosure might refer only to a single sensor 116. Even in such cases, it should be appreciated that multiple sensors 116 can be substituted. Furthermore, state information 114 obtained by sensor 116 can relate to, e.g., a state of premises 106, or to a state of equipment, devices, or components related thereto, as detected by sensor 116 and/or in accordance with management or monitoring service 110.

As described herein by reference, a single HNB device (e.g., HNB device 104), or logical collections or groups can be targeted by direct and exclusive communications propagated by a femtocell network, rather than utilizing flood broadcasting as is typically employed to transmit messages to users via a macro network (not shown). For example, when delivering communications to a mobile, flood broadcasting is traditionally employed since the location of the mobile device is not generally known, even when the mobile device is a femtocell network subscriber. However, targeting individual HNB devices (or even individual mobile devices) or logical groupings of HNB or mobile devices can be accomplished, e.g., by way of a logically assigned service area identifier (SAI) or the like, which can coincide with a particular zip code or a service area for, say a utility company or another third party 120. Accordingly, a particular SAI can be assigned to all customers of, say, an electric power company within a particular zip code or area. Thus, the electric company can now target billing notifications or the like only to those customers by employing the particular SAI.

Regardless of whether or not that above-mentioned or otherwise referenced features (e.g., the ability to target specific homes) are employed in connection with the presently disclosed subject matter, it should be appreciated that the presence within a premises (e.g., premises 106) of a dedicated communications signal afforded by HNB can be leveraged to provide a number of benefits either to user 108, femtocell network provider 118, as well as to third parties 120 with which user 108 has an arrangement, for instance, an arrangement or contract to pay for electricity supplied by third party 120. One such benefit can be provisioning of a full-featured premises management or monitoring service 110, which can leverage the presence of the femtocell network at premises 106 as well as leverage or replace existing infrastructure or services of third parties 120. Thus, current services, features, or options provided by third parties 120 can be substantially enhanced, while new services or options can be provided to user 108 as well, which is further discussed with reference to the remainder of the drawings.

Figure 2:
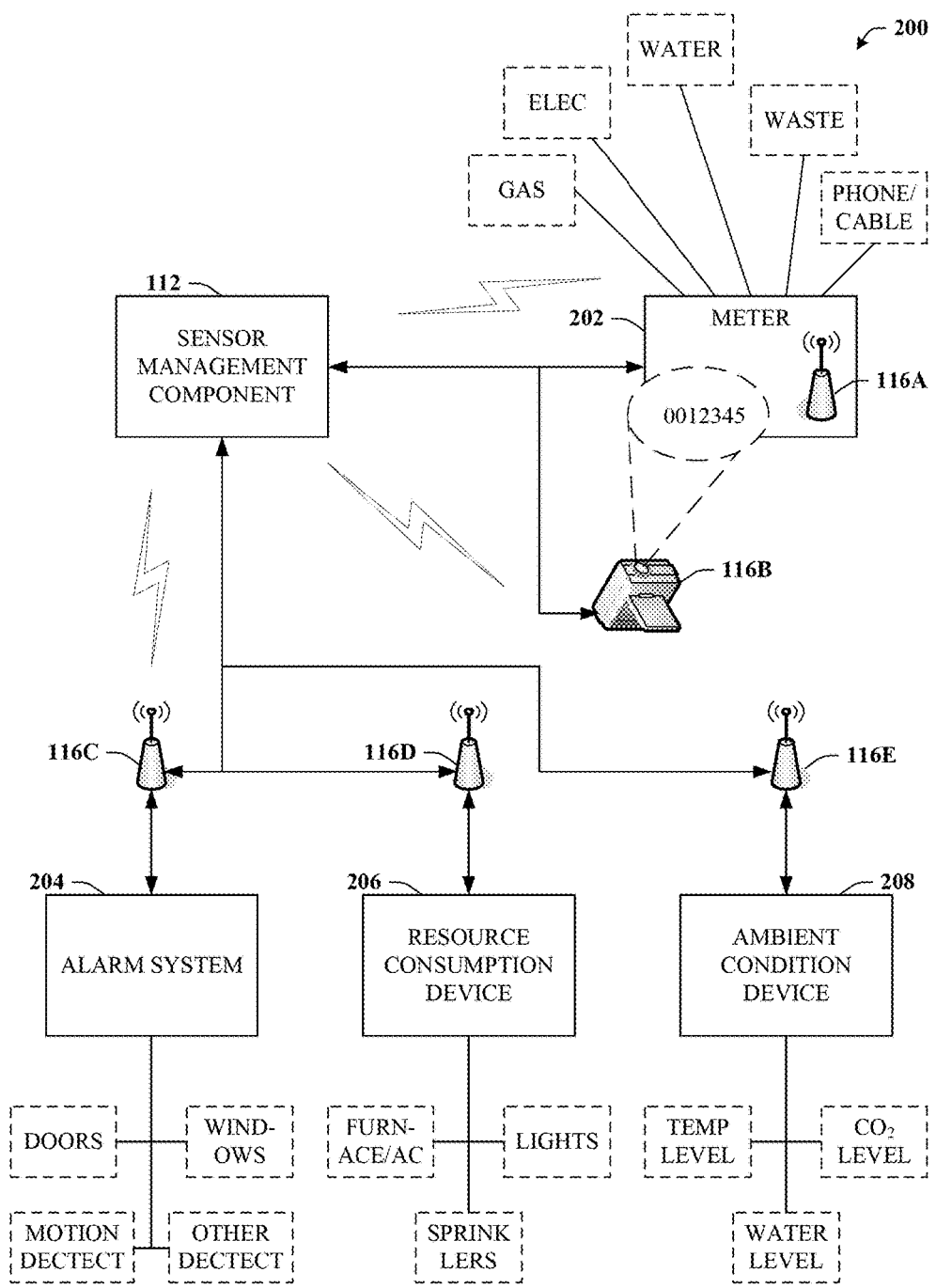
FIG. 2 provides a block diagram of a system which illustrates additional aspects or features of a sensor management component and associated sensors.
Figure 3:
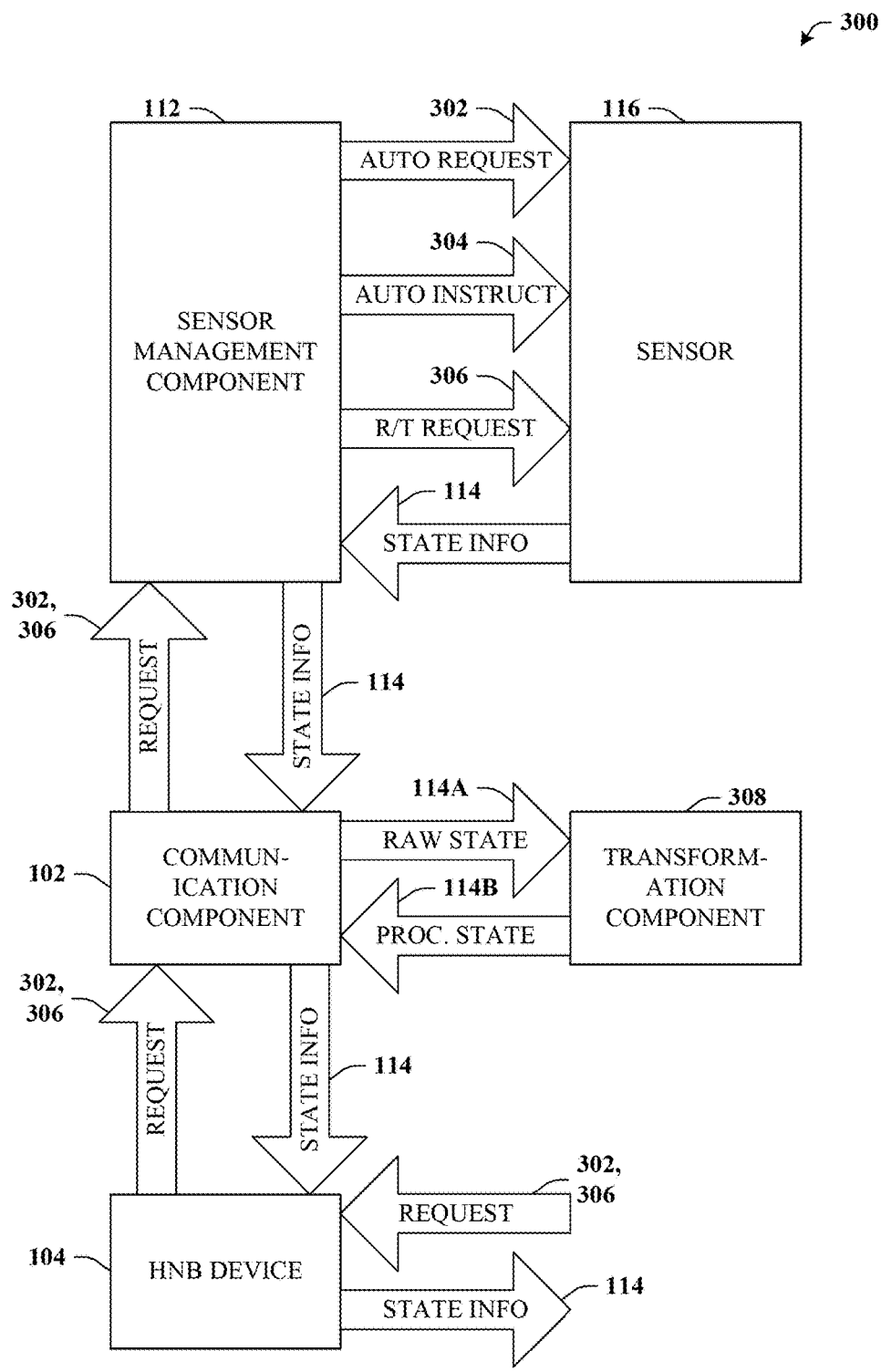
FIG. 3 illustrates a block diagram of a system that can facilitate propagation of requests and/or state information between various networked components in connection with premises management or monitoring.

It should be appreciated that, as is illustrated, either or both communication component 102 and sensor management component 112 can be situated within the geographic boundaries of premises 106, however, such is not strictly necessary in all cases. Moreover, it should be appreciated that all or portions of either or both communication component 102 or sensor management component 112 can be included in HNB device 104. Alternatively, all or portions of either or both communication component 102 or sensor management component 112 can be remote from HNB device 104, e.g., as a standalone unit, generally included in premises 106 and communicatively coupled, either wired or wirelessly, to HNB device 104. FIGS. 2 and 3 provide additional details, aspects, or features relating to system 100 or components thereof.

Likewise, while depicted as distinct elements, all or portions of management or monitoring service components 110 can be included within femtocell network platform 118. However, it should be appreciated that management or monitoring service components 110 can interface to multiple femtocell network platforms 118, potentially even competing providers, while leveraging the various infrastructures to provide the benefits detailed herein. Thus, whether separate from or included in one or more femtocell network platform 118, these benefits can be seamlessly provided. For flexibility, meter information or monitoring data can be transferred in either of two directions: (1) via meter to HNB, then over broadband connection to billing/monitoring center, or (2) from HNB directly to meter, then over the air to the wireless receiver requesting the data (e.g., utility service meter reader). Additional features, aspects, or details in connection with management or monitoring service/components 110 are provided in connection with FIGS. 4 and 5.

Turning now to FIG. 2, system 200 illustrates additional aspects or features of sensor management component 112 and associated sensors 116. Depicted are five example sensors, labeled 116A-116E, any or all of which can be coupled to sensor management component 112 via wire or wirelessly. To provide additional context, consider the example introduced supra, in which third party 120 is an electricity provider. Typically, the electricity provider will have previously installed utility meter 202 at premises 106. While for the purpose of this example, utility meter relates to an electricity meter, it should be appreciated that any suitable resource meter 202 can be employed. Some additional example depicted in FIG. 2 of resources that can be metered are natural gas, propane, water, waste (e.g., sewage or trash) or processing thereof, telephone services, cable or other data services, and so forth.

Conventionally, the electricity (or other resource) provider periodically dispatches technicians to manually read such meters 202 in order to accurately bill the owner of the premises. In some cases, particularly in more modern equipment, utility meters 202 are equipped with a short-range wireless transmitter/receiver (or transceiver) that can transmit the reading when the technician (along with suitable receiving equipment) enters a location within range of the signal. Such wireless capabilities can mitigate reading errors and simplify meter reading by technicians, and thus reduce costs for the electricity provider, but the technician still needs to be within range of the meter, which is generally about 10-20 feet depending on the power level of the transmitter, the sensitivity of the receiver as well as other factors. Thus, even with meters 202 that are equipped with a wireless transmitter, meter reading still represents a substantial expense to the resource provider, which ultimately results in higher prices for user 108 on his or her bill.

In one or more aspects of the disclosed subject matter, state information 114 discussed in connection with FIG. 1 can relate to a reading obtained by at least one sensor (e.g., sensor 116A or 116B) from utility meter 202, wherein utility meter 202 tracks usage of a resource in connection with premises 106. In cases in which the resource provider has already equipped meter 202 with a wireless transmitter (e.g., sensor 116A), the transmitter will generally be included in and operatively coupled to meter 202, as depicted. However, it should be appreciated that such need not be the case. Rather, sensor 116A can, in some cases be separate from, but communicatively coupled to utility meter 202. Regardless, state information 114, which can include the meter reading data, can be provided to sensor management component 112 and ultimately forwarded back to the appropriate third party network 120 (e.g., the electricity provider in this example) or utilized in another way, which is further discussed herein. Appreciable, errors in meter reading can be mitigated, and further, due to the presence of HNB device 104 at premises 106, the third party 120 need not dispatch meter reading technicians at all, which can amount to a substantial savings.

In cases in which utility meter 202 is not equipped with a wireless transmitter, one or both the resource provider (e.g., third party 120) or the management or monitoring service 110 might desire to install one. Additionally or alternatively, the at least one sensor that transmits state information 114 to sensor management component 112 can be an imaging device, such as a camera, which is depicted by reference numeral 116B. In other words, state information 114 in the form of a meter reading can be based upon an image of at least a portion of utility meter 202, e.g., a portion with a usage accumulator. Commonly, such usage accumulators exist in a familiar odometer-like form as depicted, however, it should be appreciated that some meters 202 track resource usage in other ways, such as with radial or dial aggregators or the like. Regardless, the meter reading can be delivered to sensor management component 112 in the form of an image captured by sensor 116B. Such an arrangement can eliminate the need for a physical coupling or interface to the actual internal meter mechanism itself. This provides ultimate flexibility and interoperability across a multitude of different meter platform types, while eliminating any potential disturbances to the existing meter.

Sensor 116B represents a potentially lower cost alternative to installing sensor 116A and/or replacing meter 202. Moreover, in order to improve security and/or prevent fraud or tampering, sensor 116B can be placed inside locked confines of meter 202. In other cases, a watermark or certificate of authenticity (COA) or other currently known or later developed mechanisms in the art of COAs or visual or image-based certification can be placed near the accumulator such that any image derived by sensor 116B can be guaranteed to some extend to be an image from the actual meter 202. In this case, state information 114 transmitted to sensor management component 112 can comprise the image of the accumulator. This image can be processed as further detailed in connection with FIGS. 3 (e.g., by communication component 102) and 5 (e.g., by master management component 406).

While the features detailed thus far have related to various aspects of utility management, it should be appreciated that numerous other features can be provided. For instance, state information 114 acquired by sensors 116 need not be limited only to meter data. Rather, state information 114 can relate to, inter alia, a state of alarm system 204 at premises 106, which is interfaced by one or more sensor 116C; a state or activity level of a (non-metered) resource consumption device 206 at premises 106, which is interfaced by one or more sensor 116D; a state associated with an ambient condition-based device 208 at premises 106, which is interfaced by one or more sensor 116E.

Alarm system 204 can relate to existing equipment or infrastructure or substantially any suitable device related thereto operating at premises 106. Thus, state information 114 can relate to a state of any existing alarm system 204 (e.g., whether armed or activated), a state of doors or windows (e.g., whether open or closed), a state of motion detectors, noise detectors, or other detectors (e.g., whether armed or when triggered). Appreciably, third party 120 security companies can employ the disclosed subject matter to reduce costs in a number of ways or a femtocell network provider 118 can manage various aspects of premises 106 security, which is further detailed with reference to FIGS. 3 and 5.

Similarly, resource consumption device 206 generally relates to non-metered devices, such as furnaces, air conditioning units, lights, sprinklers and so forth. Accordingly, state information 114 propagated by sensor(s) 116D can relate to the state of such devices (e.g., whether active). Moreover, as detailed in connection with FIGS. 3 and 5, such devices 206 can be remotely monitored or managed (e.g., activated or deactivated), e.g., by user 108 when away from premises 106 by way of femtocell network 118 and/or other network components. In another example, state information 114 can relate to various ambient conditions at premises 106 or portions thereof. Such ambient conditions can be obtained by various devices 208, such as, e.g., a temperature reading for one or more rooms, a carbon dioxide ($CO_2$) level in the air, a water level for a chamber and so forth. Regardless of the actual type or nature of state information 114, these data can be acquired by sensors 116A-116E, which may or may not be included in devices or units associated with reference numerals 202-208, and transmitted back to sensor management component 112, where such data can ultimately be interpreted and/or acted upon as detailed herein.

Referring now to FIG. 3, system 300 that can facilitate propagation of requests and/or state information between various networked components in connection with premises management or monitoring is provided. System 300 can include one or more sensors 116, examples of which have been detailed supra, as well as sensor management component 112 that can receive state information 114 from sensor(s) 116 as previously disclosed. In addition to what has been detailed, in one or more aspects of the disclosed subject matter, sensor management component 112 can automatically request state information 114 by way of automatic request 302. Sensor management component 112 can deliver automatic request 302 at a predetermined interval, e.g., to comply with or at the behest of, say, a third party 120 utility provider. Accordingly, automatic request 302 can be transmitted, say, at the last day of the month for each month in which user 108 retains the services of an associated third party 120 utility provider; or, say, every four hours while user 108 is out-of-town in order to, e.g., remotely monitor the status of premises 106 or to manage premises 106. Additionally or alternatively, sensor management component 112 can instruct sensor(s) 116 to automatically transmit state information 114 at the predetermined interval, which is depicted as automatic instruction 304. Thus, communications from sensors 116 can be either solicited or unsolicited and therefore be directed to either push or pull technologies.

In one or more aspect of the disclosed subject matter, communication component 102 can receive, either directly or indirectly, a real time request 306 for state information 114. Real time request 306 can be forwarded to sensor management component 112. Accordingly, sensor management component 112 can employ real time request 306 to instruct sensor 116 to immediately transmit state information 114. Upon receipt of suitable state information 114, communication component 102 can facilitate propagation of state information 114 by way of HNB device 104 to a management or monitoring service (e.g., 110) or to substantially any upstream component or provider associated with a femtocell network 118 or third party 120. Thus, it should be appreciated that requests for information obtained by sensors 116 residing on premises 106 can originate substantially anywhere and from substantially any authorized party or agent thereof. In response, the requested data (e.g., state information 114) can be delivered to substantially any authorized party or agent thereof regardless of location by leveraging the network infrastructure and premises presence of femtocell networks.

Accordingly, the disclosed subject matter can, e.g., enable a third party 120 utility provider to request and receive meter reading data without deploying a technician to the site of premises 106. Furthermore, third party 120 utility provider might also request various other data such as account information or the like. As another example, user 108 can, e.g., in response to observing a heat wave report near premises 106, request state information 114 relating to a home sprinkler system, receive an indication that the system is currently inactive, and transmit an instruction to activate the sprinkler system, even when away from home. Such communications can be achieved by way of a mobile device, e.g., employing SMS messages, potentially with embedded links to, e.g., activate the presently inactive sprinkler inquired about and so forth.

In addition, in one or more aspects of the disclosed subject matter, system 300 (or system 100) can further include transformation component 308. Transformation component 308 can transform state information 114 prior to propagation or dissemination by communication component 102. For example, transformation component 308 can receive raw state information 114A (e.g., data as transmitted by one or more sensor 116) and transform raw state information 114A into processed state information 114B (e.g., data more convenient or usable by other components or devices). As one example, consider the case in which sensor 116 transmits an image (e.g., raw state information 114A) of a utility meter aggregator. Such data will typically exist in an image-based encoding, which might not be suitable for third party 120 utility provider who might prefer data in alpha-numeric format to plug into a data field. Accordingly, transform component 308 can employ, e.g., optical character recognition (OCR) or the like to transform the image into another desired format. Appreciable, the above constitutes just one example, and others can be envisioned and suitable with the disclosed subject matter. For example, object recognition can be employed along with machine learning techniques, potentially in connection with a type of sensor 116 from which state information 114 is produced.

Figure 4:
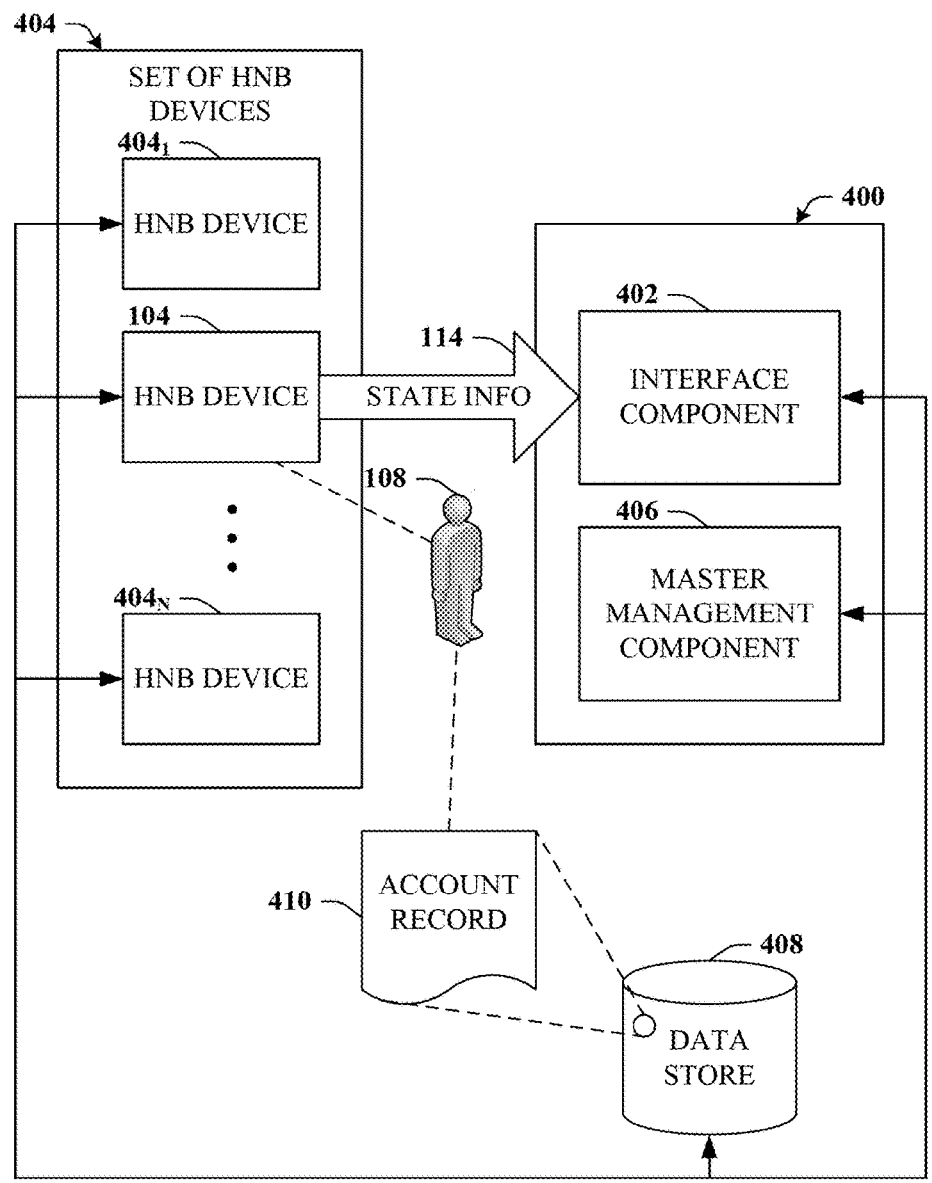
FIG. 4 is a block diagram of a system that can employ a femtocell network in order to facilitate a premises management or monitoring service.

With reference now to FIG. 4, system 400 that can employ a femtocell network in order to facilitate a premises management or monitoring service is depicted. Generally, system 400 can include interface component 402 that can be configured to interface to a set 404 of HNB devices. Set 404 can include substantially any number, N, of HNB devices $404_1$-$404_N$ as well as HNB device 104 referenced previously used consistently throughout this disclosure. Set 104 of HNB devices can represent all or a portion of a Universal Mobile Telecommunication System (UMTS) Terrestrial Radio Access Network (UTRAN) infrastructure for one or more femtocell network providers 118.

Interface component 402 can receive state information 114 from a specific HNB device (e.g., HNB device 104) included in set 404. Such state information 114 can be originally obtained by at least one sensor (e.g., sensor 116 from previous drawings) at a premises (e.g., premises 106) that relates to a location of the specific HNB device 104, and can relate to a state of the premises as discussed supra.

Moreover, system 400 can also include master management component 406 that can store state information 114 as well as various other suitable data to data store 408, e.g., to account record 410 that is associated with HNB device 104 or to a user thereof, such as user 108. As used herein, data store 408 is intended to be a repository of all or portions of data, data sets, or information described herein or otherwise suitable for use with the described subject matter. Data store 408 can be centralized, either remotely or locally cached, or distributed, potentially across multiple devices and/or schemas. Furthermore, data store 408 can be embodied as substantially any type of memory, including but not limited to volatile or non-volatile, sequential access, structured access, or random access and so on. It should be understood that all or portions of data store 408 can be included in systems 400 or 100, or can reside in part or entirely remotely from system 400 (or system 100).

Regardless, account record 410 and/or data store 408 can store state information 114 as well as billing information, associations between user 108 and third parties 120, histories, profiles, settings, preferences, and so forth. Thus, master management component 406 can employ state information 114 (or other data included in account record 410 or data store 408) to provide a premises management or monitoring service as further described herein. It should be appreciated that system 400 can constitute all or a portion of a management or monitoring service (e.g., 110), and, as previously detailed, can reside upstream from set 404 of HNB devices, e.g., in a femtocell network platform 118 component or a component of a macro network or core network for a wireless communication system. Thus, system 400 or related components can be readily interfaced to various third party networks 120, which is further detailed in connection with FIG. 5.

Figure 5:
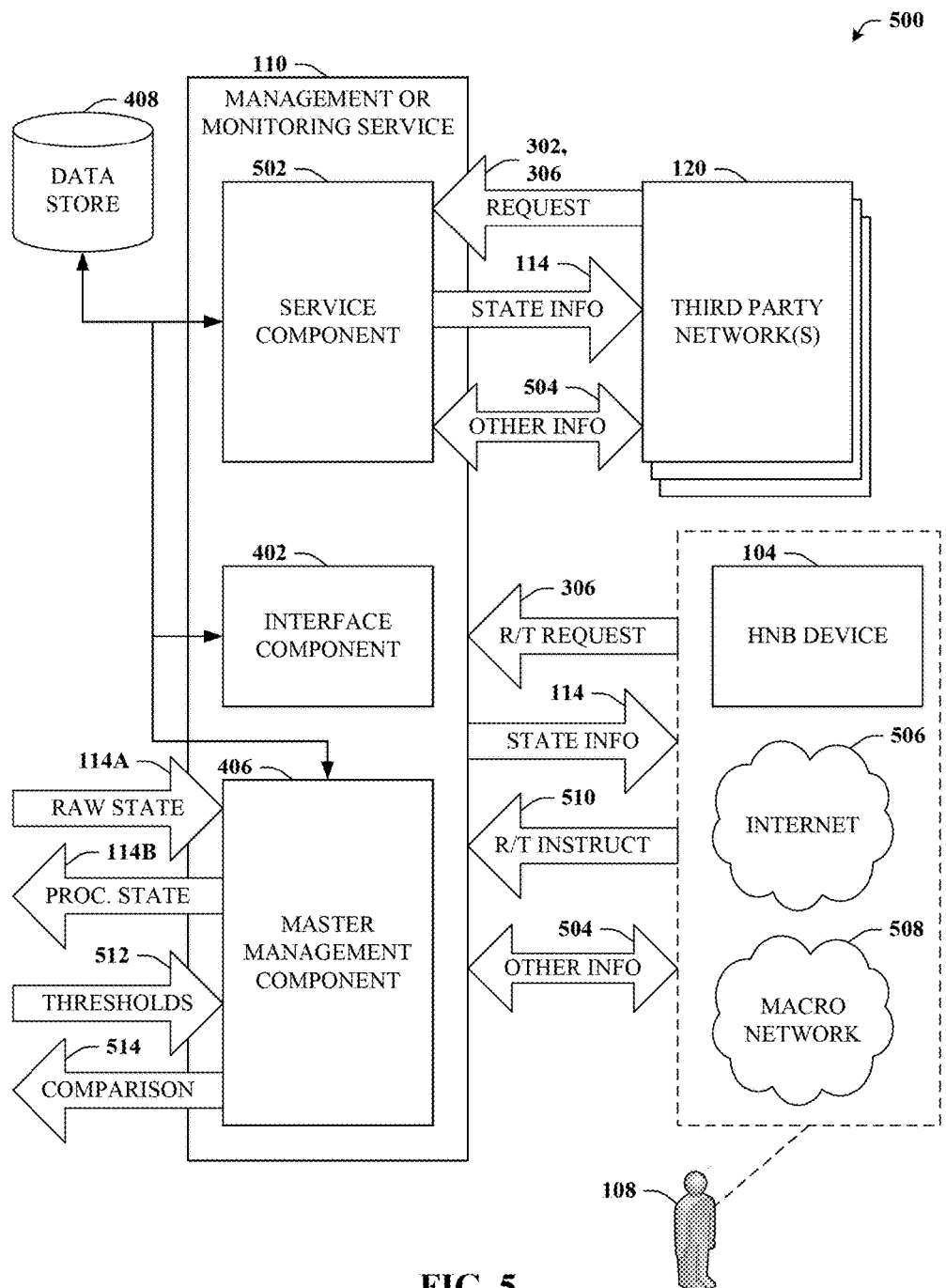
FIG. 5 provides a block diagram of a system that provides additional features, aspects or detail in connection utilization of a femtocell network to facilitate a premises management or monitoring service or components thereof.

Turning now to FIG. 5, system 500 that provides additional features, aspects or detail in connection utilization of a femtocell network to facilitate a premises management or monitoring service or components thereof is illustrated. System 500 can thus represent management or monitoring service components 110 as discussed in connection with FIG. 1. In more detail, system 500 can include interface component 402 that can receive state information 114 and master management component 406 that can employ state information 114 to provide premises management or monitoring services as substantially described supra with respect to FIG. 4.

In addition, system 500 (or management or monitoring service components 110) can further include service component 502 that can interface to at least one third party 120 network. The at least one third party 120 network can relate to at least one of a utility provider (e.g., gas or electricity), a security provider (e.g., a home alarm service), an emergency service provider (e.g., fire or police), or other third parties 120 as previously noted.

In one or more aspects of the disclosed subject matter, service component 502 can provide a secure login for the third parties 120 such that associated networks can access data stored in data store 408 (e.g., account information relating to user 108 or previously obtained state information 114) or to request a real time reading from one or more sensor 116. Likewise, master management component 406 can provide various interfaces that can enable user 108 to enact a variety of transactions, e.g., via the specific HNB device 104 (e.g., SMS) or via a web-based login or interface. For example, user 108 can access account record 410 or other data included in data store 408, set one or more predefined thresholds 512, examine a current state of premises 106, update a current state of premises 106, or the like. Thus, user 108 can facilitate transmission of requests, such as real time request 306 (e.g., what is the temperature of a particular room at premises 106, have any doors or windows been opened in the past 48 hours, . . . ), provide instructions such as real time instruction 510 (e.g., lower the thermostat for the furnace by 10 degrees, activate the sprinklers, . . . ), or receive state information 114 or other information 504 (e.g., notifications detailed infra). Given the inherent capabilities of femtocell network, any or all of the above-mentioned features, as well as other suitable features, can be accomplished by way of direct communication with HNB device 104, over the Internet 506 or another network, or via macro network 508.

Moreover, master management component 406 can, in one or more aspects, produce comparison 514 between state information 114 and the predefined thresholds 512. For example, thresholds 512 can relate to values or readings of sensors 116 at premises 106. Thus, user 108 can set a threshold for, say, the temperature of a particular room. When a thermostat sensor 116 registers a reading that surpasses threshold 512, which can be determined by comparison 514. Furthermore, such a determination, rather than being confined only to premises 106, can leverage the femtocell network 118 platform for additional actions, responses, or features, as detailed herein.

For example, based upon comparison 514, master management component 406 can facilitate transmission of a notification, which is represented by other information 504, as in addition to the notification, various other data can be included or transmitted in a like manner. The notification can be transmitted to at least one third party 120 or to user 108 or another party associated with the specific HNB device 104 associated with premises 106 that spawned the relevant state information 114. It should be further appreciated that master management component 406 can also handle or facilitate processing raw state information 114A into processed state information 114B, as substantially detailed in connection with transformation component 308 of FIG. 3. Thus, such processing or transformation of data included in state information 114 can occur either on-site at premises 106 or off-site at an upstream, centralized location.

Moreover, as introduced above, the notification (or substantially any other information 504) can be formatted as an SMS and can include a uniform resource locator (URL), a uniform resource identifier (URI), or substantially any suitable reference or link to, e.g., provide a convenient means for adjusting threshold 512, defining actions when threshold 512 is surpassed, accepting or assenting to the predefined action to be take when threshold 512 is surpassed or assenting to a bill payment notification, and so forth. Additionally or alternatively, the link can invoke a view of an invoice, a history, a receipt or confirmation, or substantially any suitable information.

Figure 6:
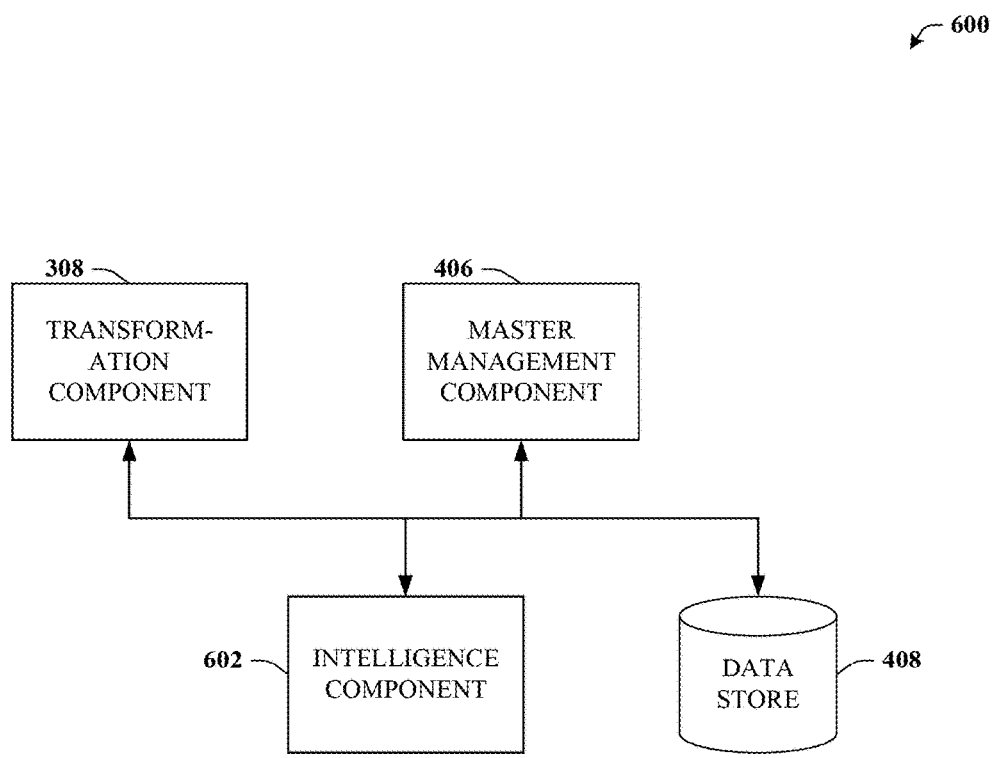
FIG. 6 illustrates a block diagram of a system that can perform or aid with various determinations or inferences.

Now turning to FIG. 6, system 600 that can perform or aid with various determinations or inferences is illustrated. Generally, system 600 can include transformation component 308 and master management component 406 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, transformation component 108 or master management component 406 can intelligently determine or infer outputs based upon recognition techniques such as OCR or object recognition. In addition, master management component 406 can intelligently determine or infer suitable actions to take based upon, e.g., comparison 514 or thresholds 512; or when to provide notifications as well as what type of data to include in those notifications. Such can be based upon historical analysis, the type of sensor 116 collecting the data, to mention but a few examples.

In addition, system 600 can also include intelligence component 602 that can provide for or aid in various inferences or determinations. In particular, in accordance with or in addition to what has been described supra with respect to intelligent determinations or inferences provided by various components described herein, e.g., all or portions of transformation component 308 or master management component 406. Additionally or alternatively, all or portions of intelligence component 602 can be included in one or more components described herein. Thus, intelligence component 602 can reside in whole or in part either at premises 106 or upstream at a centralized network location. Moreover, intelligence component 602 will typically have access to all or portions of data sets described herein, such as data store 408.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
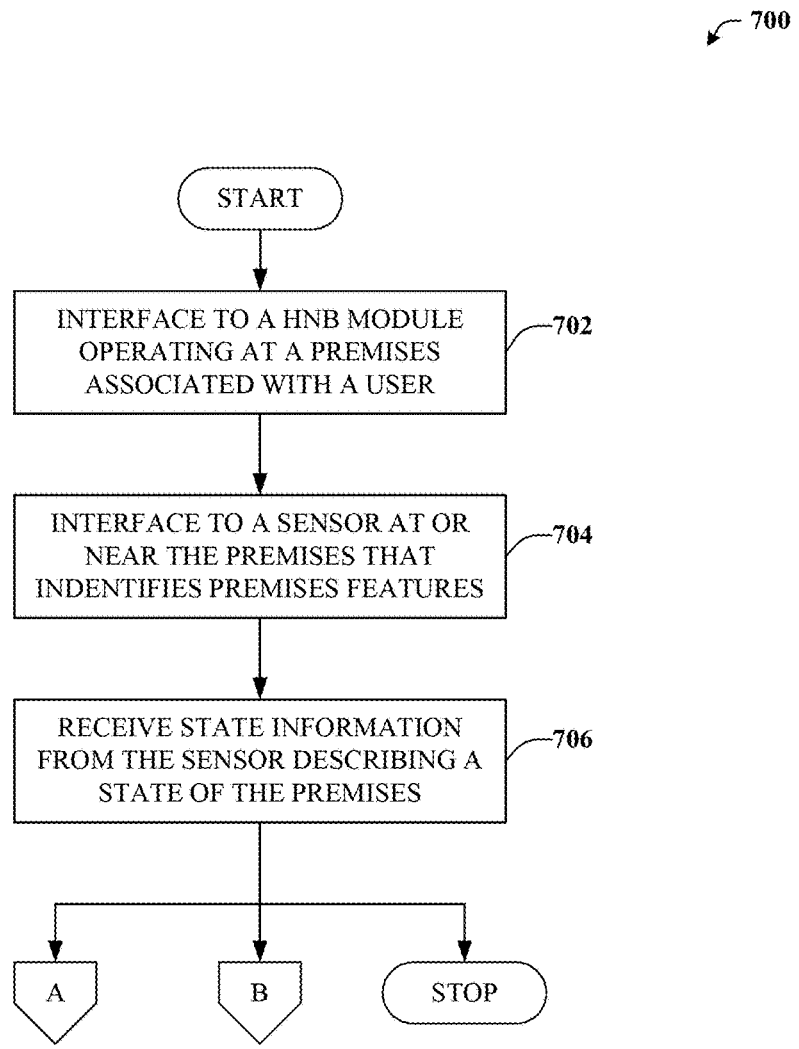
FIG. 7 is an exemplary flow chart of procedures that define a method for leveraging femtocell network infrastructure for facilitating premises management or monitoring.
Figure 8:
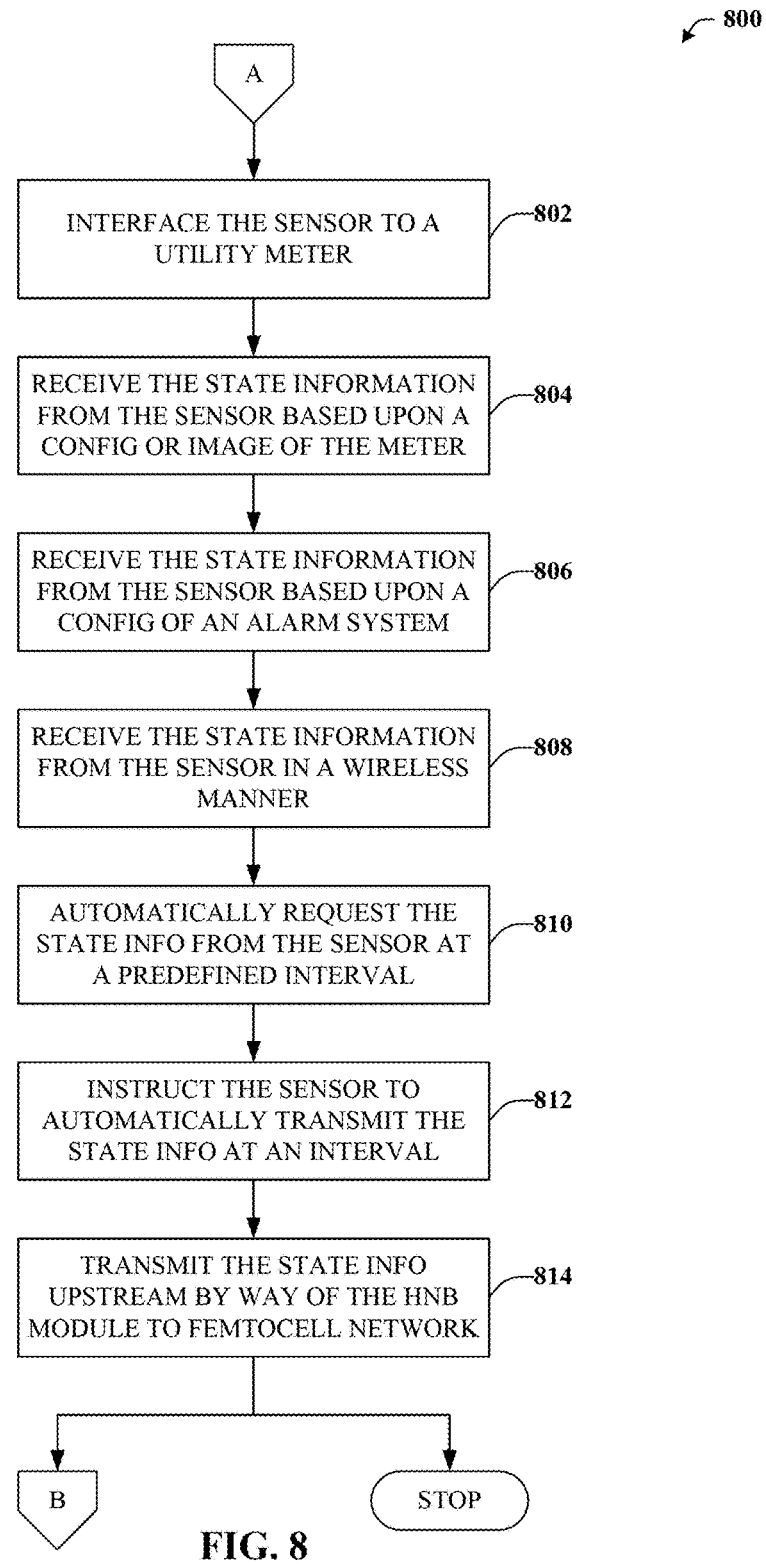
FIG. 8 is an exemplary flow chart of procedures that define a method for acquiring and/or utilizing state information in connection with facilitating premises management or monitoring.
Figure 9:
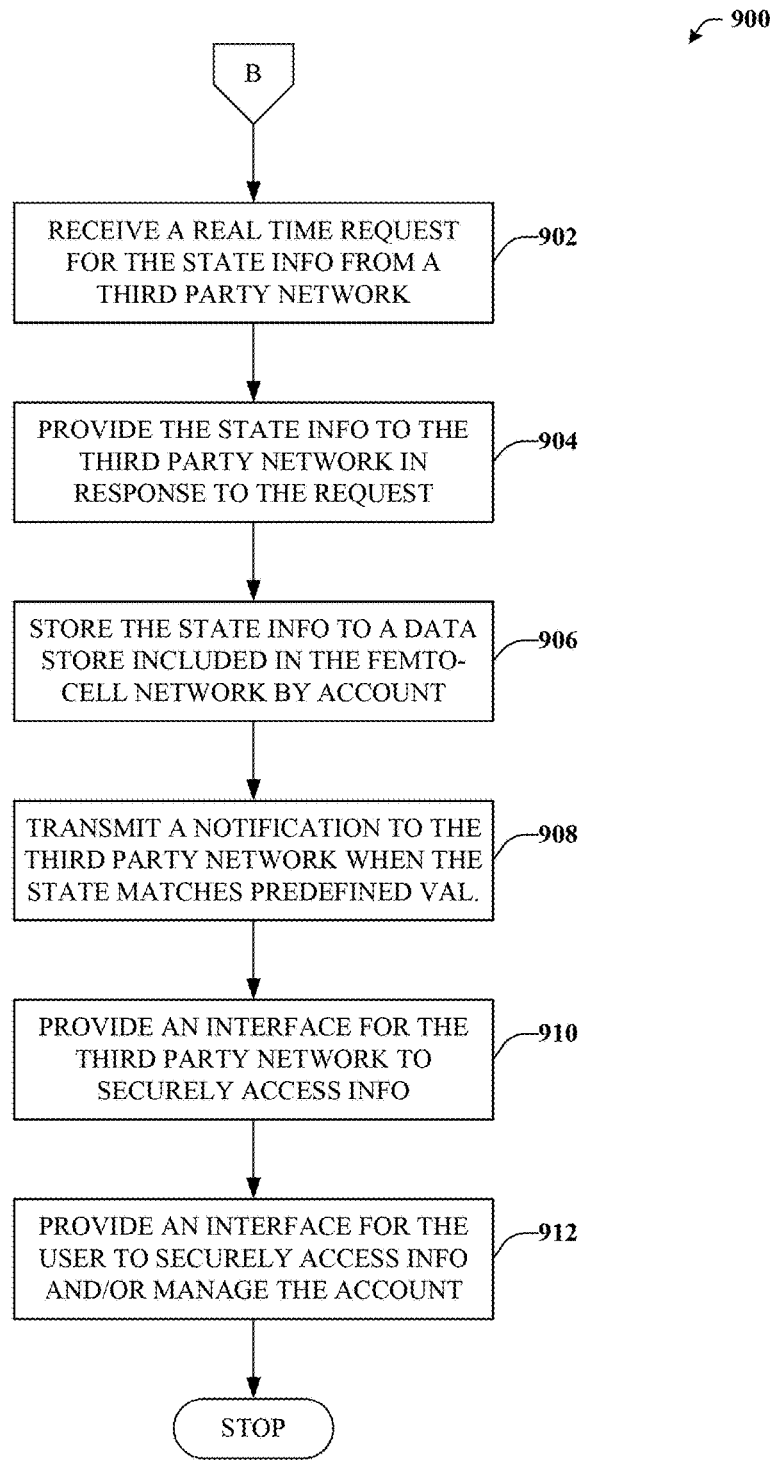
FIG. 9 depicts an exemplary flow chart of procedures defining a method for providing various addition features or aspects in connection with leveraging femtocell network infrastructure for facilitating premises management or monitoring.

FIGS. 7, 8, and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for leveraging femtocell network infrastructure for facilitating premises management or monitoring is depicted. Generally, at reference numeral 702, a home nodeB (HNB) module operating at a premises associated with a user of a management or monitoring service can be interfaced to. Thus, the user or subscriber to a particular femtocell network can also subscribe to the management or monitoring service, irrespective of whether or not both services are provided by the same entity.

Likewise, at reference numeral 704, at least one sensor at or proximal to the premises can be interfaced to. The at least one sensor can be configured to identify characteristics associated with the premises or for equipment, components, or devices located at or proximal to the premises. Accordingly, at reference numeral 706, state information can be received from the at least one sensor. The state information can, e.g., describe a state of the premises or the state of associate equipment, components, or devices thereon as identified by the at least one sensor. Appreciably, the at least one sensor can be included in such equipment, components, or devices.

With reference now FIG. 8, exemplary method 800 for acquiring and/or utilizing state information in connection with facilitating premises management or monitoring is provided. At reference numeral 802, the at least one sensor can be interfaced or coupled to a utility meter, wherein the utility meter can relate to measuring consumption of a particular resource. For example, the utility meter can measure usage or electricity, gas, water, waste (or processing thereof), telephone, Internet, cable, or another data port.

At reference numeral 804, the state information from the at least one sensor received in connection with reference numeral 706 of FIG. 7 can be received based upon a configuration of the utility meter, e.g., a reading for resource usage from an accumulator or aggregator included in the utility meter. Additionally or alternatively, the state information can be based upon an optical image of all or a portion of the utility meter. Thus, the at least one sensor can be a camera or another imaging device, configured to capture the appropriate information displayed by the utility meter.

Next to be described, at reference numeral 806, the stat information from the at least one sensor can be received based upon a configuration of an alarm system, a non-metered resource consuming device, an ambient condition monitor or device, or the like. It should be appreciated that the state information can be received over a wired infrastructure, or according to a wireless protocol. In accordance with the latter, at reference numeral 808, the state information can be received from the at least one sensor in a wireless manner.

Regardless of the type or manner of receiving, at reference numeral 810, the state information can be automatically requested from the at least one sensor at a predefined interval or based upon a schedule. Additionally or alternatively, at reference numeral 812, the various sensors can instructed to automatically transmit the state information periodically according to the same or similar schedule or predefined interval. Thus, sensors can be polled in real time or instructed to push state information according to a locally maintained schedule or interval. Thus, at reference numeral 814, the state information, once retrieved from one or more sensors, can be transmitted upstream by way of the HNB module to a central server associated with a femtocell network provider and/or with the management or monitoring service provider.

Turning briefly now to FIG. 9, an exemplary method 900 for providing various addition features or aspects in connection with leveraging femtocell network infrastructure for facilitating premises management or monitoring is depicted. For example, at reference numeral 902, a real time request for state information can be received from, e.g., a third party network that is communicatively coupled to the femtocell network. As another example, the real time request for state information can be received from an authorized account user such as the owner of the premises or the subscriber to the femtocell network that authorized installation of the HNB module at the premises.

At reference numeral 904, the state information can be provided to the third party network (or to the authorized account user) in response to the real time request. In addition or in the alternative, at reference numeral 906, the state information can be stored to a data store included in and/or maintained by the femtocell network. In particular, the state information can be stored in a manner that references an account associated with the user.

Moreover, at reference numeral 908, a notification can be transmitted to the third party network or to the user when the state information matches a predefined state. For example, state data indicates a fire at the premises or a break-in, a notification can be automatically delivered to local authorities or rescue bureaus (e.g., third party networks). Likewise, the same or similar information can be provided to the user as well, potentially via SMS or the like. Appreciably, the notification need not necessarily relate to emergency situations. Rather, the notification can identify, e.g., that a device on the premises is active or inactive, and notify the user accordingly, or that a waste receptacle is approaching capacity, which can be of interest to a third party waste removal service.

Furthermore, various interfaces can be provided, such that third parties as well as the user can send or receive various information. For example, at reference numeral 910, an interface for the third party network can be provided to enable secure access associated with account data or an associated sensor at the premises. For instance, a sensor included in or coupled to a utility meter maintained by the third party. Similarly, at reference numeral 912, an interface can be provided for enabling the user to manage the account. This latter interface can be formatted or streamlined for SMS propagation in connection with a small form factor display such as those displays common on mobile communication devices.

Figure 10:
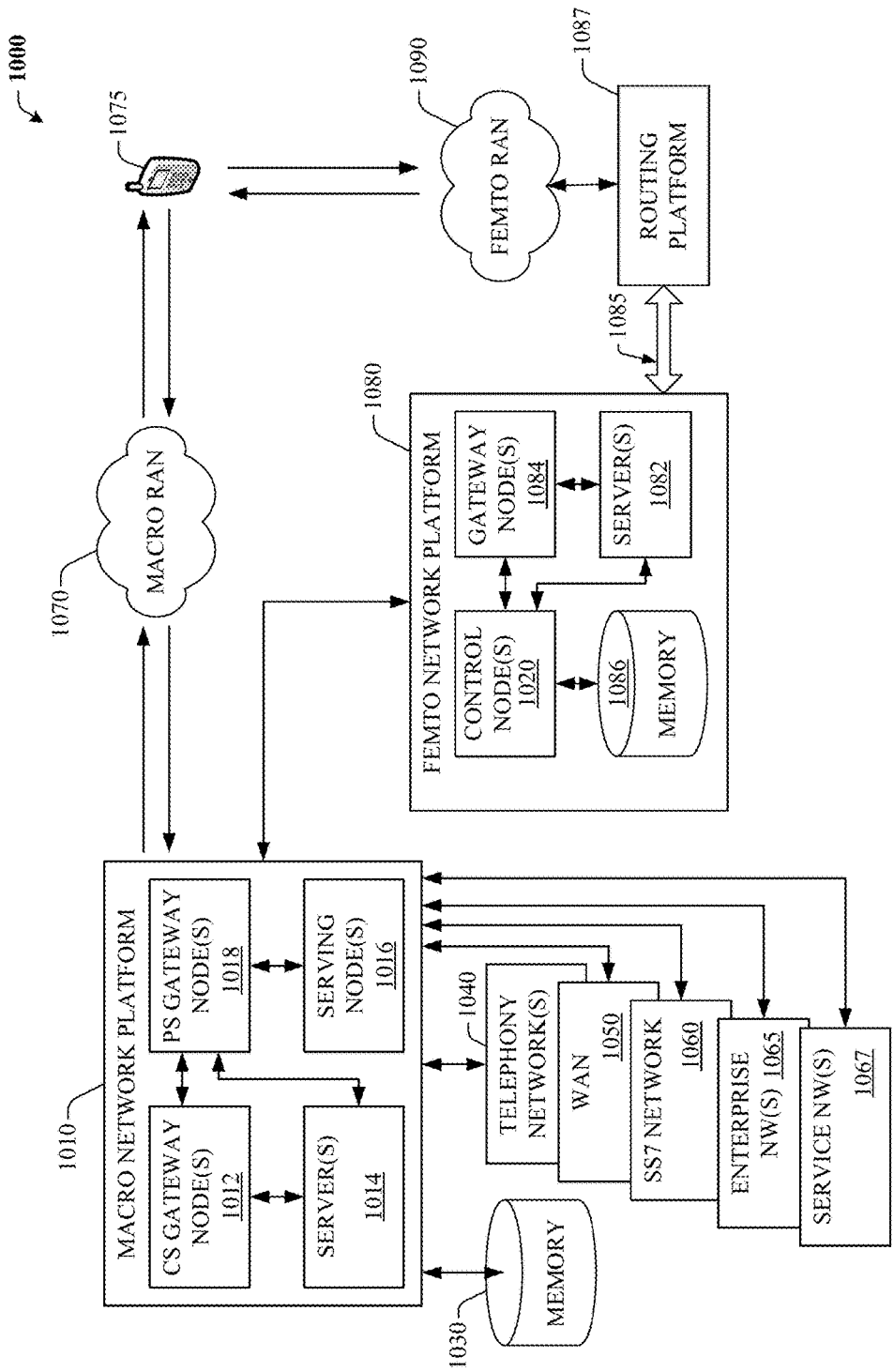
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e g, implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
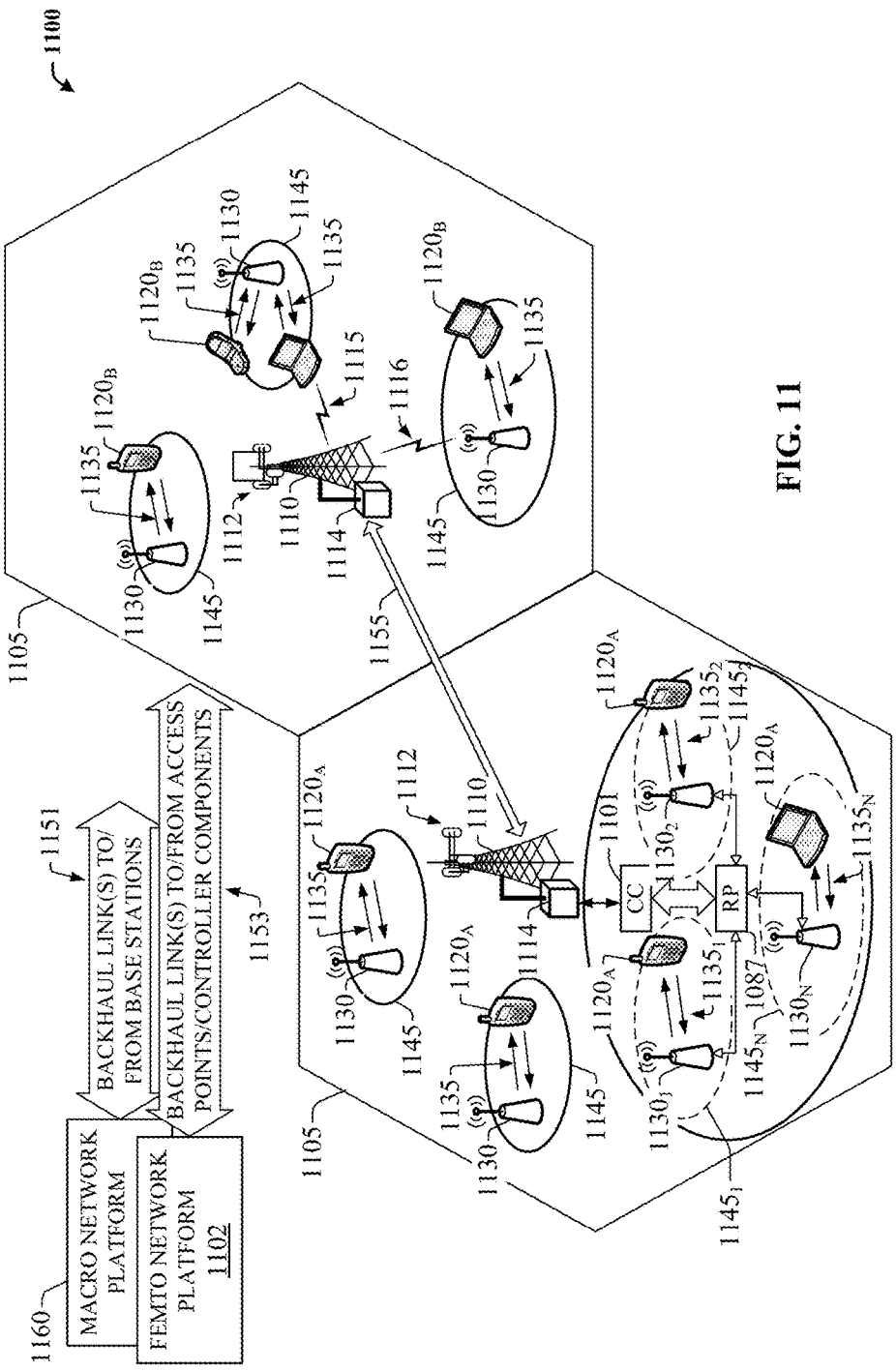
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs $1120_A$ can be routed by the RP 102, for example, internally, to another UE $1120_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points $1130_1$-$3730_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE $3720_A$ connected to femto APs $1130_1$-$3830_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
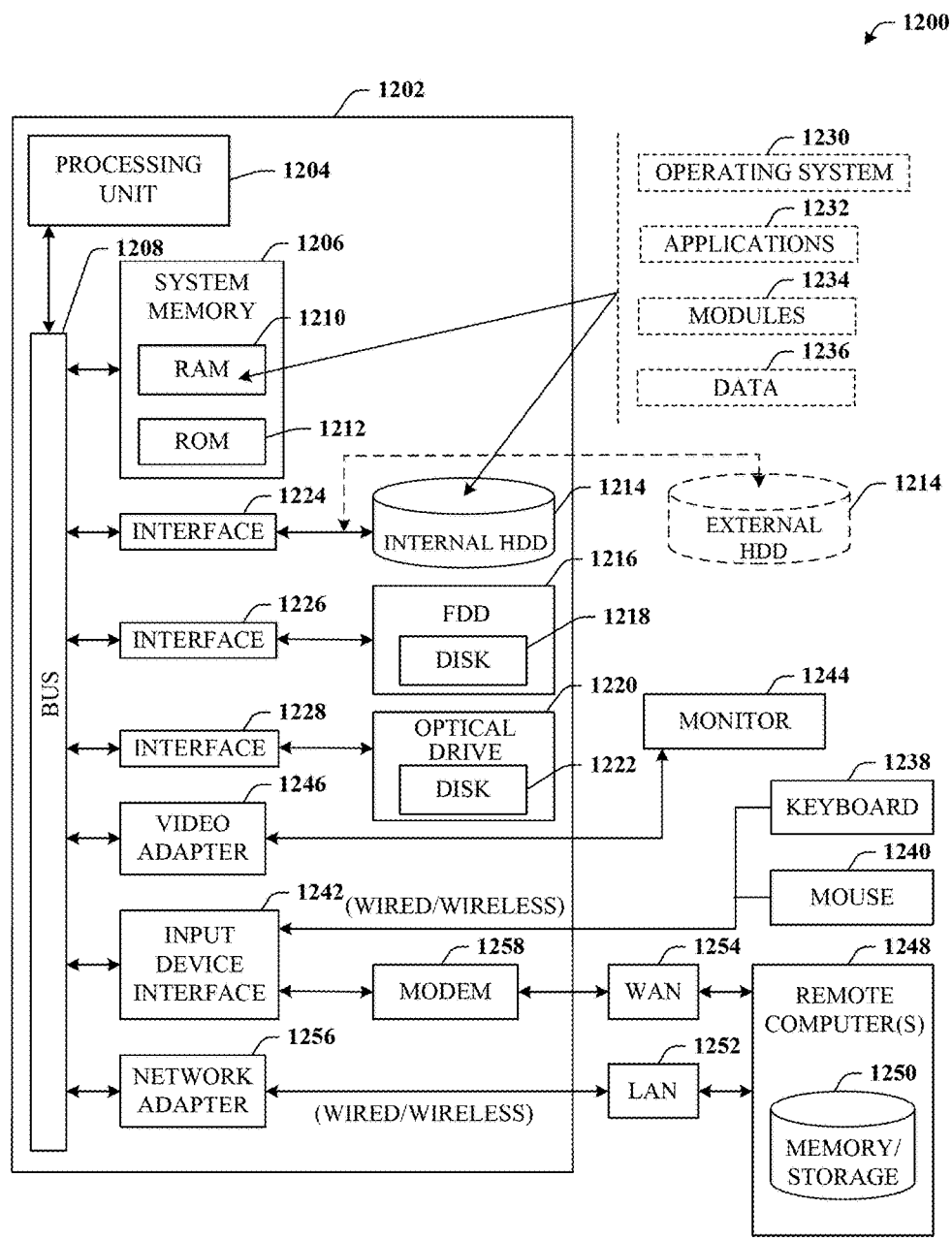
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11

(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A femtocell device, comprising:
   a data structure comprising identifier data comprising:
   a first service area identifier that identifies a first group of femtocell devices that is assigned to the femtocell device in response to a determination that respective locations of the first group of femtocell devices share a common service provided by a first entity that differs from a network service provided by the femtocell device; and
   a second service area identifier that identifies a second group of femtocell devices that is assigned to the femtocell in response to a determination that respective locations of the second group of femtocell devices share a common service provided by a second entity that differs from the network service provided the femtocell device;
   a processor; and
   a memory that stores executable instructions that, when executed by the processor, facilitate performance of operations, comprising:
   receiving, from a sensor device, state data indicative of a state of a premises at which the femtocell device is situated;

via a communication path of first nodes comprising first network devices of a communication network and second nodes comprising second network devices of a femtocell network, receiving, from a first network device of the first network devices of the communication network, request data indicative of a request for the state data, wherein the communication network is not the femtocell network, and wherein the second network devices comprise a femtocell network gateway device and the femtocell device; and in response to the receiving the request data, transmitting the state data to the first network device via the communication path.

2. The femtocell device of claim 1, wherein the sensor device is a metering device that determines usage of a resource at the premises.

3. The femtocell device of claim 2, wherein the state data represents the usage of the resource at the premises.

4. The femtocell device of claim 1, wherein the sensor device is a thermostat device that determines a state of an ambient condition at the premises.

5. The femtocell device of claim 4, wherein the state data represents the state of the ambient condition.

6. The femtocell device of claim 1, wherein the sensor device is a security device that monitors the premises according to a security protocol.

7. The femtocell device of claim 1, wherein the first service area identifier and selection of the members of the first group of femtocell devices are configured based on input data from the first entity that provides a service at the premises and that differs from a network provider entity that provides the femtocell network.

8. The femtocell device of claim 7, wherein the input data comprises a zip code for the premises and an indication that the first entity provides the service at the premises.

9. The femtocell device of claim 7, wherein the input data comprises information relating to a service area of the first entity.

10. A femtocell device, comprising:
a data structure comprising identifier data comprising:
a first service area identifier that identifies a first group of femtocell devices that is assigned in response to a determination that respective locations of the first group of femtocell devices share a first service provided by a first entity that differs from a network service provided by the femtocell device; and
a second service area identifier that identifies a second group of femtocell devices that is assigned in response to a determination that respective locations of the second group of femtocell devices share a second service provided by a second entity that differs from the network service provided by the femtocell device, wherein the second entity differs from the first entity;
a processor; and
a memory that stores executable instructions that, when executed by the processor, facilitate performance of operations, comprising:
via a communication path that traverses first network devices of a communication network and second network devices of a femtocell network, receiving, from a different device of the communication network, instruction data indicative of an instruction to modify a state of a premises at which the femtocell device is situated, wherein the communication network is not the femtocell network, and wherein the second network devices comprise a femtocell network gateway device and the femtocell device; and in response to the receiving the instruction data, transmitting, to a control device that controls the state of the premises, control data indicative of the instruction.

11. The femtocell device of claim 10, wherein the operations further comprise:
in response to a determination that the state is being updated according to the instruction, transmitting an acknowledgement to the different device by way of the communication path.

12. The femtocell device of claim 10, wherein the control device is a thermostat device that controls a state of an ambient condition at the premises.

13. The femtocell device of claim 12, wherein the instruction data is an instruction to change the ambient condition at the premises from a first state to a second state.

14. The femtocell device of claim 10, wherein the control device is a security device that controls a state of a security system at the premises.

15. The femtocell device of claim 14, wherein the instruction data is an instruction to change a state of a locking mechanism of the security system from a first state to a second state.

16. The femtocell device of claim 14, wherein the instruction data is an instruction to change a state of arming of the security system from a first state to a second state.

17. The femtocell device of claim 10, wherein the control device is an appliance device and the instruction data is an instruction to change a state of the appliance device from a first state to a second state.

18. A non-transitory machine-readable storage medium, comprising executable instructions that, when executed by a processor, facilitate performance of operations, comprising:
receiving, from a sensor device, state data indicative of a state of a premises at which a femtocell device is situated;
by way of a communication path comprising first nodes representing first network devices of a communication network and comprising second nodes representing second network devices of a femtocell network, receiving, from a device of the communication network, request data indicative of a request for the state data, wherein the first nodes are not the second nodes, wherein the second network devices comprise a femtocell network gateway device and the femtocell device, wherein the request data comprises:
a first service area identifier that identifies a first group of femtocell devices that is assigned in response to a determination that the premises is served by a first entity that differs from a network service provider entity that provides the femtocell device: and
a second service area identifier that identifies a second group of femtocell devices that is assigned in response to a determination that the premises is served by a second entity that differs from the network service provider entity that provides the femtocell device; and
in response to the receiving the request data, transmitting the state data to the device by way of the communication path.

19. The non-transitory machine-readable storage medium of claim 18, wherein the first service area identifier and selection of members of the first group of femtocell devices are configured based on input data from the first entity.

20. The non-transitory machine-readable storage medium of claim 19, wherein the input data comprises information relating to a service area of the first entity.

* * * * *